W. T. HENSLEY.
CLUTCH MECHANISM.
APPLICATION FILED JULY 24, 1914. RENEWED OCT. 6, 1916.
1,226,769.
Patented May 22, 1917.
2 SHEETS—SHEET 1.
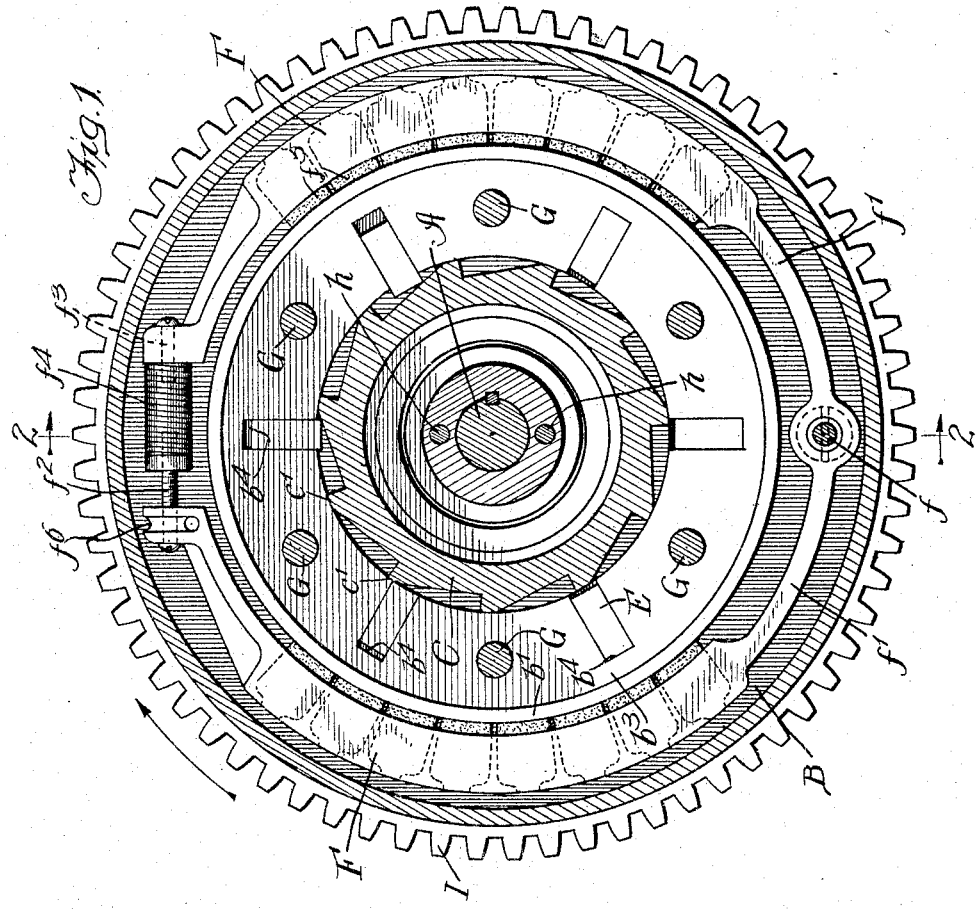
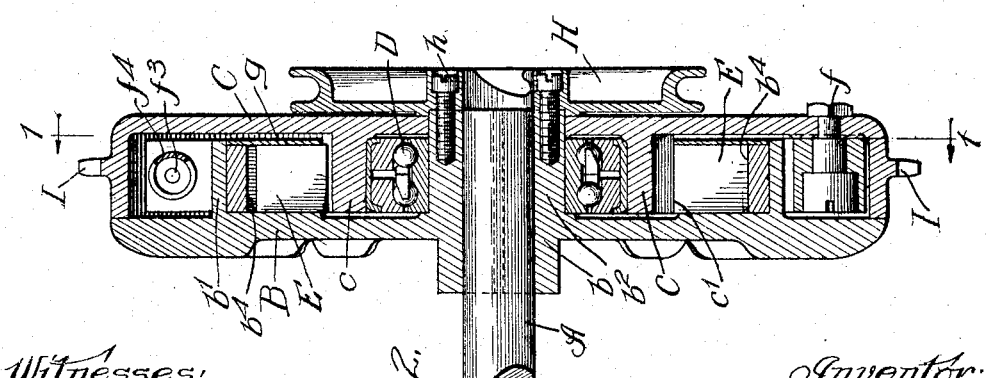
Witnesses:
Arthur H Carlson
Robert S. Weir
Inventor:
William T. Hensley
By Arthur F. Durand
Atty.

W. T. HENSLEY.
CLUTCH MECHANISM.
APPLICATION FILED JULY 24, 1914. RENEWED OCT. 6, 1916.
1,226,769.
Patented May 22, 1917.
2 SHEETS—SHEET 2.
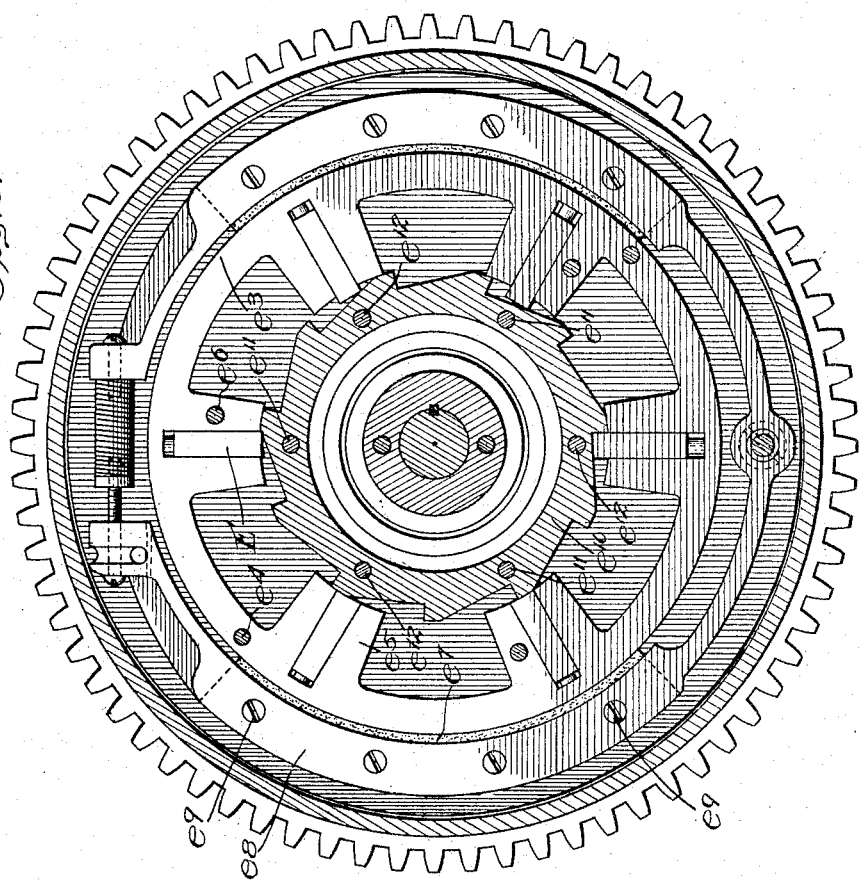
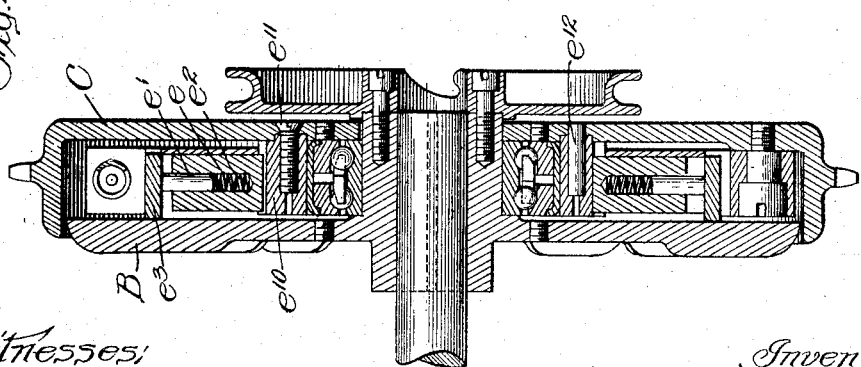

UNITED STATES PATENT OFFICE.

WILLIAM T. HENSLEY, OF BOUNDBROOK, NEW JERSEY, ASSIGNOR TO AMERICAN ENGINE AND ELECTRIC COMPANY, OF MIDDLESEX, NEW JERSEY, A CORPORATION OF DELAWARE.

CLUTCH MECHANISM.

1,226,769. Specification of Letters Patent. Patented May 22, 1917.

Application filed July 24, 1914, Serial No. 852,845. Renewed October 6, 1916. Serial No. 124,203.

*To all whom it may concern:*

Be it known that I, WILLIAM T. HENSLEY, a citizen of the United States of America, and resident of Boundbrook, Somerset county, State of New Jersey, have invented a certain new and useful Improvement in Clutch Mechanism, of which the following is a specification.

My invention relates to clutches for various purposes, but more particularly to those having means for automatically stopping or limiting the transmission of power when the rotation reaches a predetermined speed, and especially to those which are employed as a part of the transmission of an electric starter, as for automobile or similar engines.

Generally stated, the object of my invention is to provide a novel and efficient form of clutch mechanism having a ratchet for transmitting the power in one direction, and having friction means for transmitting power in the opposite direction, the rotation being in the same direction in each case, and the relative arrangement of the parts being such that the friction means have a larger surface in contact with the brake band or friction shoe than heretofore, as will hereinafter more fully appear.

Another object is to provide a clutch mechanism of this kind, having a novel construction and arrangement whereby the ratchet will be practically noiseless and free from the clicking sound which ordinarily accompanies the operation of a device of this kind.

It is also an object to provide certain details and features of construction and combinations tending to increase the general efficiency and serviceability of a ratchet and friction clutch mechanism of this particular character.

To the foregoing and other useful ends my invention consists in matters hereinafter set forth and claimed.

In the accompanying drawings—

Figure 1 is a section on line 1—1 in Fig. 2 showing a clutch mechanism embodying the principles of my invention.

Fig. 2 is a section on line 2—2 in Fig. 1.

Figs. 3 and 4 are similar to Figs. 1 and 2 and show another form of my invention.

As thus illustrated, my invention comprises a shaft A which may be the crank shaft of an internal combustion engine of an automobile or other vehicle, or a shaft for any other suitable purpose. The disk like member B has a hub portion $b$ which is secured in any suitable manner upon said shaft. Upon its inner face the said disk is provided with an annular flange $b^1$, which latter is preferably arranged near the outer periphery of the disk to provide a flange of maximum diameter—that is to say, to provide a flange practically as great in diameter as the size of the clutch will permit. The other disk-like member C is mounted to turn on the inner hub portion $b^2$ of the disk B, being provided with a ball bearing D of any suitable character for this purpose. The inner face of the disk C is provided with a flange $c$ having ratchet teeth $c^1$ formed on the periphery thereof. With the construction shown, a ring $b^3$ having radial slots is secured to the member B, immediately inside of the flange $b^1$, being of such size that it fits loosely over the outer ends of the teeth $c^1$ of the ratchet. The pawls E are carried in the slots $b^4$, each pawl being somewhat shorter than the slot thereof, whereby said pawls are capable of a sliding motion toward and away from the axis of rotation. Thus, and as shown in Fig. 1, when a pawl is above the axis of rotation it will drop down and engage the ratchet teeth, assuming that the rotation is not too great, or assuming that the mechanism is standing still, which latter is the case when it is desired to start the engine of an automobile. Brake bands or friction shoes F are pivoted to the disk member C at $f$, each band or shoe having a flexible and springy stem or end portion $f^1$ between the body of the band or shoe and the said pivot. The other ends of the said bands or shoes F are connected by a bolt $f^2$ fastened to one band, and a similar bolt or screw $f^3$ fastened to the end of the other band or shoe, these two screws being connected by a coil spring $f^4$, said spring serving by its tension to draw the two bands or shoes toward each other. Each said band or shoe is provided with carbon inserts $f^5$ which bear upon the outer surface of the flange $b^1$, the frictional contact thus provided being regulated by the tension of the said spring. For this purpose any suitable means can be employed for varying the tension of the spring $f^4$, as by using a rotary device $f^6$ having threaded engagement with the bolt or screw $f^2$, and being held in a notch in the upper end of the brake band or shoe. Bolts or screws G are inserted through the ring $b^3$ to secure the same to the disk member B, and a ring plate $g$ can be interposed between the ring $b^3$ and the disk member C and held in place by these same screws, whereby the pawls E are held against lateral displacement. Any suitable means can be employed for holding the disk member C against displacement from the end of the hub portion $b^2$, and whereby the parts are retained in operative condition. For example, the pulley wheel H can be secured to the hub portion $b^2$ by screws $h$, thereby serving as a collar to keep the disk C in position. A belt on this pulley wheel will drive the fan which is ordinarily employed for cooling the engine.

In practice, and when it is desired to start the engine, the electric motor (which is not shown, but which may be of any suitable character,) is operated to transmit power through a sprocket chain to the teeth I on the periphery of the clutch, the disk member C having said teeth formed integral therewith. This rotates the member C in the direction indicated by the arrow in Fig. 1, causing the ratchet teeth $c^1$ (or some of them) to operatively engage one or more of the pawls E, thereby causing the member B to rotate the engine shaft. As soon, however, as the speed of rotation reaches a certain degree, after the engine has started, the member B will rotate faster than the member C, the pawls E sliding backward over the teeth of the sprocket wheel, and in practice the said pawls will then be thrown outward by centrifugal force. In this way, and while the engine is operating the motor as a generator, and while the automobile is running at high speed, the said pawls do not engage the teeth of the ratchet wheel, and the ordinary clicking sound is eliminated. The yielding of the spring $f^4$, when the two brake bands or friction shoes F are thrown outward by centrifugal force, permits the member B to rotate faster than the member C, whereby the speed of rotation of the latter will remain constant; but this constant speed can be changed at any time, in accordance with any particular requirements, by increasing or diminishing the tension of the spring $f^4$, thereby increasing or diminishing the friction.

It will be seen that by arranging the ratchet inside of the friction means, the operative surface of the latter is thereby greatly increased—that is to say, the area of contact between the brake bands or friction shoes and the flange $b^1$ is much greater than would be the case with the ratchet arranged outside of the friction means, instead of inside in the manner shown. It will also be seen that the springy portions $f^1$ serve to equalize the pressure of the brake bands or brake shoes F on the flange $b$, as with this provision the said bands or shoes can yield a little at their pivoted ends, as well as at their other or spring connected ends. This, it will be seen, tends to equalize the wear on the inserts $f^5$ of the two bands or shoes. The large wearing surface makes it possible to employ a greater number of these inserts than will be the case with the friction means disposed inside of the ratchet, and in this way the wear on each individual insert is reduced to a considerable degree.

By unequally spacing the pawls E, there will never be a time when all of the pawls are in use, but there will always be at least one tooth which is in operative engagement with a pawl, or quite close to it, and any pawl is capable of doing the required work. As shown in Fig. 1, the mechanism is supposed to be standing still, and hence the upper pawls have dropped into engagement with the ratchet, but the three lower pawls have dropped out of engagement. Under high speed all of the pawls will remain out of engagement. With this construction, no springs are employed for the pawls, and the action while positive is noiseless in character, as formerly stated.

As shown in Figs. 3 and 4, the construction is substantially the same as that previously described. In this case, however, the pawls E are provided with sockets $e$ which receive the pins $e^1$ and the springs $e^2$, the said pins being radially arranged and fixed at their outer ends on the ring $e^3$, which latter is held against displacement relative to the member B by means of parallel keys $e^4$ inserted between the said ring and the segmental sections $e^5$, which latter are secured to said member B by screws $e^6$ or other suitable means. It will be seen that the ring $e^3$ corresponds to the integral flange $b^1$ of Figs. 1 and 2, and that the segments $e^5$ correspond to the ring $b^3$ of said previously described construction. The curved wearing blocks $e^7$ of the brake shoes $e^8$ are each of a length suitable for each side of the clutch, as distinguished from Figs. 1 and 2 in which the wearing surfaces of the brake shoes are provided by a plurality of carbon blocks $f^5$ for each brake shoe. The long curved blocks $e^7$ are preferably held in place by screws $e^9$, or by any suitable means. It will also be seen that in Figs. 3 and 4 the ratchet or toothed ring $e^{10}$ is secured to the clutch member C by means of screws $e^{11}$, instead of being formed integral with said member as shown in Figs. 1 and 2. In addition to these screws $e^{11}$, the said clutch member C and ratchet ring $e^{10}$ are held against displacement by pins $e^{12}$, whereby loosening of the three screws will then permit separation of the said member and ring. With this construction, therefore, the pawls E are not only actuated by gravity, when they reach a point above the ratchet ring, but are also positively operated by the springs $e^2$, whereby said pawls are always in engagement with the ratchet ring when the clutch is standing still, thereby enabling the pawl which happens to be nearest to a tooth to communicate the power from the starting motor to the engine shaft; whereas with the construction shown in Figs. 1 and 2 the uppermost pawls will always be the ones which must be relied upon to perform this function, inasmuch as the pawls below the axis of rotation are out of engagement with the toothed ratchet wheel. Consequently, and with the construction shown in Figs. 3 and 4, a minimum of lost motion is always involved in the transmission of power from the motor to the engine shaft in the initial starting of the engine. The springs $e^2$, it will be understood, are so tensioned that they are just barely strong enough to support the weight of the pawls when the latter are below the axis of rotation, whereby said pawls are always in engagement with the ratchet wheel except when the clutch is rotating, as in such case the centrifugal force is sufficient to compress the springs, thus disengaging all of the pawls from the toothed ratchet ring, it being understood that this latter condition is necessary when the transmsission of power is reversed for the purpose of charging the storage battery by which the motor is operated. In addition, it will be seen that the ring $e^3$ is removable, and that it can be replaced by a new one when worn or impaired by use. This is also true of the toothed ring $e^{10}$, this ring being separable from the clutch member or disk C in the manner previously described.

What I claim as my invention is:—

1. A clutch mechanism comprising two rotary members for alternately communicating power to each other, a ratchet by which one member communicates power to the other member, and friction means by which power is communicated from said other member to the one member, said members rotating in the same direction for both transmissions of power, and said ratchet having sliding pawls which are operated by gravity and automatically held in disengaged position by centrifugal force when the rotation attains a predetermined speed.

2. A clutch mechanism comprising two rotary members for alternately communicating power to each other, a ratchet by which one member communicates power to the other member, and friction means by which power is communicated from said other member to the one member, said members rotating in the same direction for both transmissions of power, and said ratchet being arranged concentrically within said means, said ratchet having radial sliding pawls operated by gravity and automatically held in disengaged position by centrifugal force when the rotation attains a predetermined speed.

3. A clutch mechanism comprising two rotary members for alternately communicating power to each other, a ratchet by which one member communicates power to the other member, and friction means by which power is communicated from said other member to the one member, said members rotating in the same direction for both transmissions of power, and said ratchet including teeth extending outwardly away from the axis of rotation, and radial sliding pawls for engaging said teeth, said other member having radial slots for said pawls.

4. A clutch mechanism comprising two rotary members for alternately communicating power to each other, a ratchet by which one member communicates power to the other member, and friction means by which power is communicated from said other member to the one member, said members rotating in the same direction for both transmissions of power, said ratchet including a plurality of radially arranged and sliding pawls, a series of ratchet teeth for engagement with said pawls, and springs for holding said pawls in engagement with said teeth, said springs being adapted to yield readily when the pawls are thrown outward by centrifugal force.

5. A clutch mechanism comprising two rotary members for alternately communicating power to each other, a ratchet by which one member communicates power to the other member, and friction means by which power is communicated from said other member to the one member, said members rotating in the same direction for both transmissions of power, said ratchet including a toothed ring which is removable separately and by itself from the clutch, and one or more pawls for engaging the teeth of said ring.

Signed by me at Boundbrook, N. J., this 6th day of July, 1914.

WILLIAM T. HENSLEY.

Witnesses:
 FLORENCE A. HOSKING,
 R. L. REED.

Copies of this patent may be obtained for five cents each, by addressing the "Commissioner of Patents, Washington, D. C."